United States Patent
Shan et al.

(10) Patent No.: US 11,247,878 B2
(45) Date of Patent: Feb. 15, 2022

(54) OPERATING METHOD OF A WIND POWER JIB OF A CRANE AND CRANE

(71) Applicant: Xuzhou Heavy Machinery Co., Ltd., Xuzhou (CN)

(72) Inventors: Zenghai Shan, Xuzhou (CN); Ruixue Zhao, Xuzhou (CN); Zhican Chen, Xuzhou (CN); Shouwei Wang, Xuzhou (CN); Zhengde Zhang, Xuzhou (CN); Pinghai Zhang, Xuzhou (CN)

(73) Assignee: Xuzhou Heavy Machinery Co., Ltd., Xuzhou (CN)

( * ) Notice: Subject to any disclaimer, the term of this patent is extended or adjusted under 35 U.S.C. 154(b) by 0 days.

(21) Appl. No.: 17/213,844

(22) Filed: Mar. 26, 2021

(65) Prior Publication Data

US 2021/0221657 A1    Jul. 22, 2021

Related U.S. Application Data

(62) Division of application No. 15/828,992, filed on Dec. 1, 2017, now Pat. No. 10,988,354.

(30) Foreign Application Priority Data

Dec. 2, 2016  (CN) .......................... 201611092558.2

(51) Int. Cl.
   *B66C 23/82*   (2006.01)
   *B66C 23/68*   (2006.01)
   *B66C 23/42*   (2006.01)

(52) U.S. Cl.
   CPC .............. *B66C 23/82* (2013.01); *B66C 23/68* (2013.01); *B66C 23/823* (2013.01); *B66C 23/42* (2013.01)

(58) Field of Classification Search
   CPC ......... B66C 23/42; B66C 23/44; B66C 23/62; B66C 23/64; B66C 23/66; B66C 23/68;
   (Continued)

(56) References Cited

U.S. PATENT DOCUMENTS 3,430,778 A * 3/1969 David ..................... B66C 23/70
                                                      212/300
3,664,516 A * 5/1972 Goudy .................. B66C 23/344
                                                      212/297

(Continued)

FOREIGN PATENT DOCUMENTS

CN       202766157 U      3/2013
CN       102424329 B      3/2014
                   (Continued)

OTHER PUBLICATIONS

Decision to Grant for Corresponding Chinese Application No. 201611092558.2 dated Jul. 31, 2018, with translation, 3 pages.

(Continued)

*Primary Examiner* — Sang K Kim
*Assistant Examiner* — Nathaniel L Adams
(74) *Attorney, Agent, or Firm* — Myers Bigel, P.A.

(57) ABSTRACT

The present disclosure discloses an operating method of a wind power jib of a crane and a crane, and relates to the field of engineering machinery. The method includes the following steps: rotatably connecting a main boom and a wind power jib; overturning the wind power jib to a first preset position by using a traction means of the crane; contacting a cushioning member with the wind power jib provided at the first preset position; further drawing the wind power jib to overturn to a second preset position; releasing the traction means, such that the wind power jib overturns automatically under the effect of self gravity and a cushioning member until the wind power jib is overturned in position.

8 Claims, 4 Drawing Sheets

(58) Field of Classification Search
CPC ....... B66C 23/70; B66C 23/82; B66C 23/821; B66C 23/823; B66C 23/92
See application file for complete search history.

(56) References Cited

U.S. PATENT DOCUMENTS

| | | | | |
|---|---|---|---|---|
| 3,785,505 A * | 1/1974 | Keller, Jr. | ............. | B66C 23/702 212/177 |
| 3,831,771 A * | 8/1974 | Wiencek | ............... | B66C 23/702 212/300 |
| 4,141,455 A * | 2/1979 | Henderson | ............ | B66C 23/702 212/300 |
| 4,621,742 A * | 11/1986 | Rathi | .................... | B66C 23/702 212/177 |
| 5,111,945 A * | 5/1992 | Hull | ...................... | B66C 23/702 212/168 |
| 5,673,805 A * | 10/1997 | Chaffin | ................. | B66C 23/702 212/294 |
| 6,131,750 A * | 10/2000 | Harrington | ........... | B66C 23/702 212/177 |
| 7,878,346 B1 * | 2/2011 | Watts | .................... | B66C 23/702 212/168 |
| 8,522,988 B2 * | 9/2013 | Tanaka | .................. | B66C 23/708 212/300 |
| 8,534,474 B2 * | 9/2013 | Holly | ...................... | B66C 23/70 212/177 |
| 10,988,354 B2 * | 4/2021 | Shan | ....................... | B66C 23/42 |

FOREIGN PATENT DOCUMENTS

| | | |
|---|---|---|
| CN | 204211393 U | 3/2015 |
| CN | 105460807 B | 10/2018 |
| DE | 102005049606 A1 | 4/2007 |

OTHER PUBLICATIONS

First Office Action for Corresponding Chinese Application No. 201611092558.2 dated Aug. 25, 2017, with translation, 14 pages.
Second Office Action for Corresponding Chinese Application No. 201611092558.2 dated Jan. 30, 2018, with translation, 15 pages.

* cited by examiner

OPERATING METHOD OF A WIND POWER JIB OF A CRANE AND CRANE

CROSS-REFERENCE TO RELATED APPLICATIONS

The present application is a divisional of U.S. patent application Ser. No. 15/828,992 filed Dec. 1, 2017, which application claims priority from China patent application CN106395645A filed on Dec. 2, 2016, the disclosure of which is incorporated by reference herein in its entirety.

TECHNICAL FIELD

The present application relates to the field of engineering machinery, and specifically relates to an operating method of a wind power jib of a crane and a crane.

BACKGROUND

With intensified competition in the crane hoisting market, the ultra-large tonnage cranes is subject to a dive in the operation profit of the general hoisting market. At present, the major profit sector of the hoisting work of domestic ultra-large tonnage cranes are concentrated in the wind power installation and maintenance market.

The demands of the wind power installation and maintenance market for the cranes no longer lie in the overall performance advantages of large-range and large-amplitude areas, but are concentrated in the requirements for the hoisting weight when there is a large lifting height.

Current methods may present the following problems: the main hoisting work carried out by the ultra-large tonnage cranes is fan installation. After fan installation is completed, the crane transits to the next working place to be installed the next fan. The crane includes a main boom and a wind power jib provided at a front end of the main boom. With a great dead weight, a long overall arm length and an unbalanced gravity center of a complete vehicle of the crane, the forward wind power jib may be removed before the transition, and reassemble the same upon arrival at the next fan hoisting site. In the installation and removal process, it may also be necessary to install/remove a hook and thread a steel wire rope, so that the whole installation/removal process takes a long time, thereby undoubtedly consuming time and labor. The removal process has extra hoist and extra transport vehicle, thus adding on the transition cost.

SUMMARY

An operating method of a wind power jib of a crane and a crane is provided, for effectuating transitional transport of a crane with a wind power jib without using other auxiliary vehicles.

The embodiments of the present disclosure provide an operating method of a wind power jib of a crane, comprising following steps: rotatably connecting a main boom and the wind power jib of a crane; overturning the wind power jib to a first preset position by a traction means of the crane, wherein the first preset position refers to a position at which a gravity center of the wind power jib is located on an outer side area of the main boom; contacting a cushioning member with the wind power jib provided at the first preset position; drawing the wind power jib to overturn to a second preset position, wherein the second preset position refers to a position at which a gravity center of the wind power jib is located on an inner side area of the main boom; and releasing the traction means, such that the wind power jib overturns under the effect of self gravity and a cushioning member until the wind power jib is overturned in position.

In some embodiments, the step of rotatably connecting the main boom and the wind power jib of the crane comprises: pulling off some pins between the main boom and the wind power jib, such that the wind power jib is rotatably connected to the main boom.

In some embodiments, the traction means is disposed on a top of the main boom, thereby pulling the wind power jib upward.

In some embodiments, pulling off the main pin between the main boom and the wind power jib by a hydraulic puller.

In some embodiments, he first preset position is a position at which an included angle between the wind power jib and the main boom is α, wherein α is greater than 0 degree and less than or equal to 90 degrees, 0 degree indicating that the wind power jib is horizontal, 90 degrees indicating that the wind power jib is perpendicular to the main boom.

In some embodiments, the second preset position is a position at which an included angle between the wind power jib and the main boom is α, wherein α is greater than 90 degree and less than 180 degrees, 90 degree indicating that the wind power jib is perpendicular to the main boom, 180 degrees indicating that the wind power jib is overturned in position.

In some embodiments, the traction means comprises a superlift winch, a superlift strut and a superlift steel wire rope; the step of overturning the wind power jib to a first preset position by the traction means of the crane comprises: erecting the superlift strut; and actuating the superlift winch to drive the superlift steel wire rope to be tightened, such that the superlift steel wire rope pulls the wind power jib to rotate.

In some embodiments, the method includes after the step of releasing the traction means, dropping the superlift strut.

In some embodiments, the wind power jib is provided with a guiding structure for accommodating an end of an overturning hydraulic cylinder of the cushioning member; the end of the overturning hydraulic cylinder is slidable along the guiding structure in the overturning process of the wind power jib under the effect of self gravity and the cushioning member.

In some embodiments of the present disclosure provides a crane: a main boom; a wind power jib rotatable relative to the main boom; a traction means drivingly connected with the wind power jib; and a cushioning member for producing a cushioning effect over the wind power jib.

In some embodiments, the main boom and the wind power jib are removably connected by pins, and the pins are distributed at different height positions.

In some embodiments, the cushioning member comprises an overturning hydraulic cylinder, one end of which is rotatably connected to the main boom, and the other end of which is extendable to contact the wind power jib located at the first preset position.

In some embodiments, the wind power jib is provided with a guiding structure, along which the other end of the overturning hydraulic cylinder is slidable in an overturning process of the wind power jib.

In some embodiments, the guiding structure is provided with a chute, for allowing the other end of the overturning hydraulic cylinder to enter inside.

In some embodiments, a cylinder joint is slidably provided in the chute and connectable to the other end of the overturning hydraulic cylinder.

In some embodiments, the traction means includes: a superlift strut; a superlift steel wire rope, one end of which provided at the main boom, and the other end of which provided at the wind power jib, a middle part of which passing through the superlift strut away from the main boom; and a superlift winch drivingly connected with the superlift steel wire rope, for pulling up the wind power jib by means of the superlift steel wire rope.

In some embodiments, a superlift cylinder, which is drivingly connected with the superlift strut so as to drop or erect the superlift strut.

In some embodiments, the method for overturning a wind power jib of a crane, utilizes the traction means included by the crane to pull the wind power jib, so that the wind power jib is rotated relative to the main boom. After the wind power jib is rotated to the first preset position, a cushioning means is provided for the wind power jib, and then the wind power jib is further pulled until the wind power jib can overturn by utilizing self gravity. Next, the traction means is released, and the cushioning member produces a cushioning effect to prevent sharp descend of the wind power jib. Under the effect of self gravity and the cushioning of the cushioning member, the wind power jib is rotated until being overturned in position. The traction cooperation and the cushioning means cooperate in use, such that the crane can effectuate overturning without using other auxiliary hoists. After the wind power jib is overturned, transitional transport of the crane can be directly performed without removing the wind power jib. The disclosure can effectuate transitional transport of a crane with a wind power jib without using other auxiliary overturning and transporting vehicles.

BRIEF DESCRIPTION OF DRAWINGS

The drawings described herein are used to provide a further understanding of the present disclosure and constitute a part of the present application. The illustrative embodiments of the present disclosure as well as the descriptions thereof, which are used for explaining the present disclosure, do not constitute improper definitions on the present disclosure. In the drawings.

DETAILED DESCRIPTION OF DISCLOSED EMBODIMENTS

Figure 1:
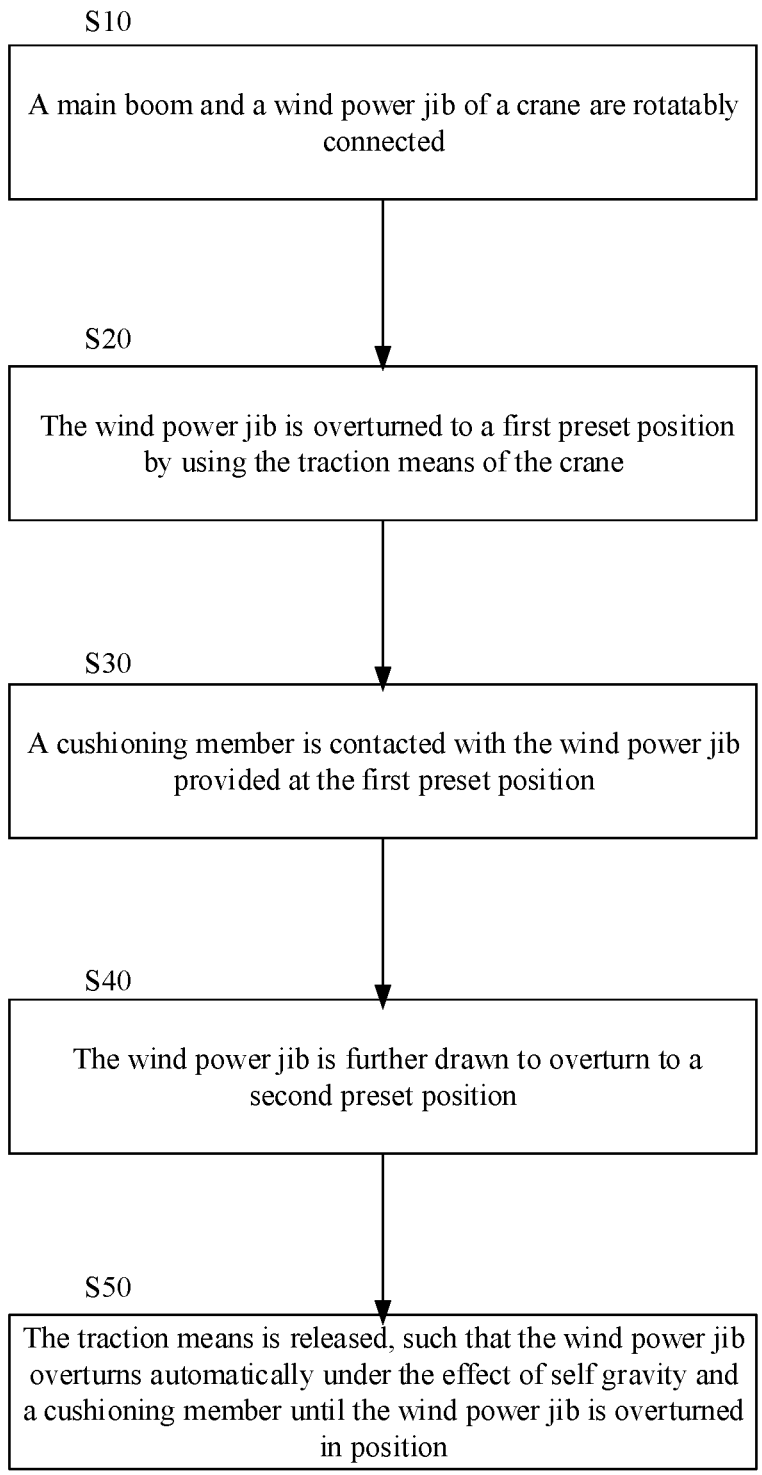
FIG. 1 is a schematic flow chart of the method for overturning a wind power jib as provided by the embodiments of the present disclosure.

The present invention now will be described hereinafter with reference to the accompanying drawings and examples, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under." The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present invention. The sequence of operations (or steps) is not limited to the order presented in the claims or figures unless specifically indicated otherwise.

The nouns or terms involved in the present text are explained as follows:

Wind power jib: a truss jib structure, the main body of which is a rectangular cross section consisting of tubings, and the performance and jib length of which is mainly directed to development of wind power operation, thus being called as a wind power jib.

Superlift means: installed on a box-type main boom, to cooperate with a steel wire rope for joint action, and to improve the rigidity of the jib.

With reference to FIG. 1, the embodiments of the present disclosure provide a method for overturning a wind power jib of a crane, which includes the following steps:

Step S10: a main boom 1 and a wind power jib 2 of a crane are rotatably connected.

Generally, the main boom 1 and the wind power jib 2 of the crane therebetween are connected by using a plurality of pins, such that when overturning the wind power jib 2, it is necessary to remove partial pins therein, and only retain the pins that enable the wind power jib 2 to rotate relative to the main boom 1. Take the present embodiment for example, with reference to FIG. 3, the main pin 5 between the main boom 1 and the wind power jib 2 is pulled off, and the overturning pin 6 therebetween is retained. The overturning pin 6 is located on a top of the main boom 1 and the wind power jib 2. The overturning pin 6 is retained to enable the wind power jib 2 to overturn upward relative to the main boom 1. The manner of overturning the wind power jib 2 upward is used, so that after the wind power jib 2 is overturned in position without additionally providing a member for supporting the wind power jib 2, as the main boom 1 can produce the supporting effect over the wind power jib 2.

Step S20: the wind power jib 2 is overturned to a first preset position by using the traction means 3 of the crane. Among them, the first preset position refers to a position at which gravity center of the wind power jib 2 is located on an outer side area of the main boom 1.

Figure 3:
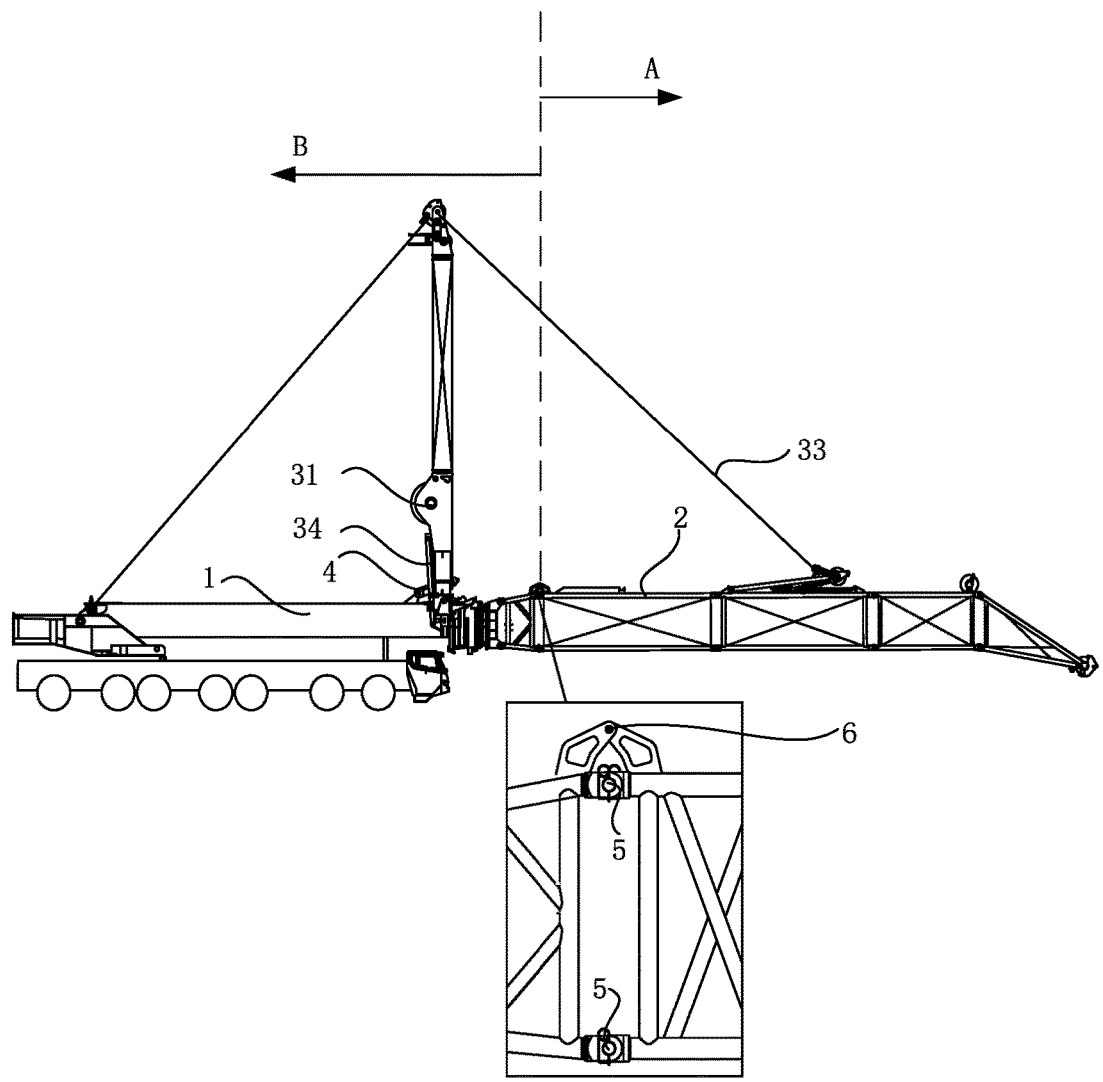
FIG. 3 is a schematic view of the wind power jib of the crane in state prior to overturning as provided by the embodiments of the present disclosure.

As shown in FIG. 3, the area A corresponds to the first preset position. At the area A, the gravity center of the wind power jib 2 is located on an outer side area of the main boom 1, and the wind power jib 2 cannot utilize self gravity to move downwards.

Figure 4:
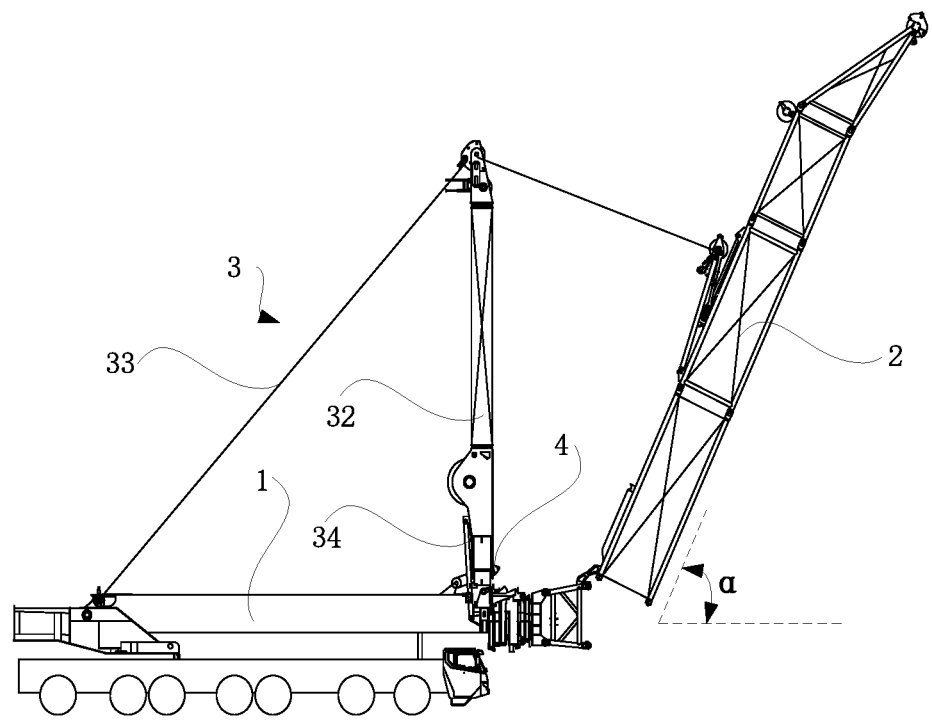
FIG. 4 is a schematic view of the wind power jib of the crane overturning to a first preset position as provided by the embodiments of the present disclosure.

With reference to FIG. 4, specifically, the first preset position is a position at which an included angle between the wind power jib 2 and the main boom 1 is α. α is greater than 0 degree and less than or equal to 90 degrees. 0 degree corresponds to the wind power jib 2 horizontal, and 90 degrees correspond to the wind power jib 2 perpendicular to the main boom 1.

Step S30: a cushioning member 4 is contacted with the wind power jib 2 provided at the first preset position.

The cushioning member 4 may be a spring or a overturning hydraulic cylinder. The cushioning member 4 may be disposed at the main jib 1 to be a part of the crane. After the wind power jib 2 is overturned to the first position, the overturning hydraulic cylinder is stretched such that the overturning hydraulic cylinder is in contact with the wind power jib 2 located at the first preset position. The overturning hydraulic cylinder may be a multi-stage cylinder, to ensure that the stretching length satisfy the requirements.

The cushioning member 4 can reduce the impact when the wind power 2 rotates by utilizing self gravity, and prevent that the sudden and rapid downward movement of the wind power jib 2 causes an impact on the main boom 1. The cushioning member 4 is provided such that the rotation process of the wind power jib 2 by utilizing self gravity becomes stable, and reliable.

Step S40: the wind power jib 2 is further drawn to overturn to a second preset position. The second preset position refers to a position at which a gravity center of the wind power jib 2 is located on an inner side area of the main boom 1.

As shown in FIG. 3, the area B corresponds to the second preset position. At the area B, the gravity center of the wind power jib 2 is located on an inner side area of the main boom 1, and the wind power jib 2 can utilize self gravity to rotate. When the wind power jib 2 is drawn to the second preset position, the wind power jib 2 can utilize self gravity to overturn, the traction means 3 may be released.

Figure 7:
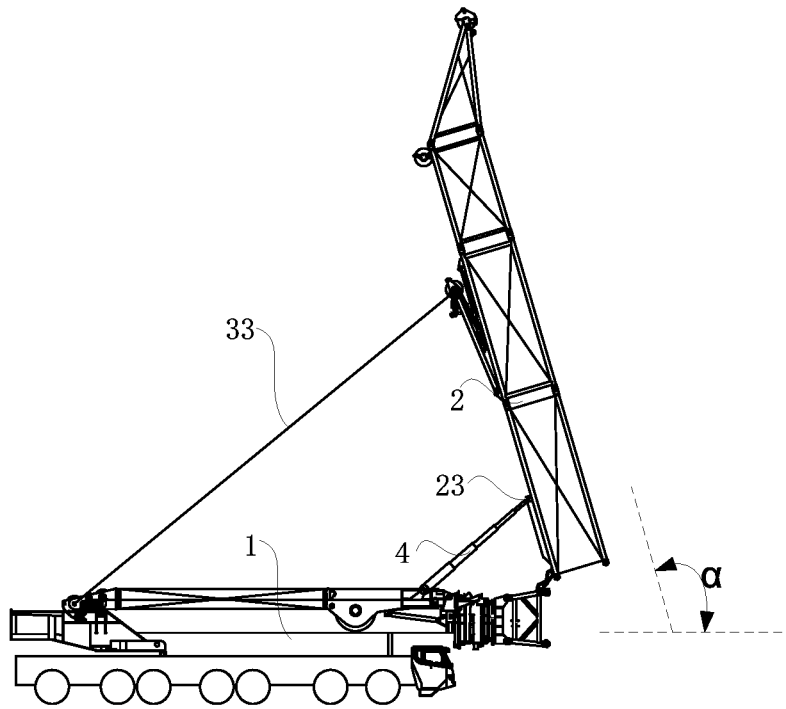
FIG. 7 is a schematic view of the wind power jib of the crane overturning to a second preset position as provided by the embodiments of the present disclosure.

With reference to FIG. 7, specifically, the second preset position is a position at which an included angle between the wind power jib 2 and the main boom 1 is α. Among them, α is greater than 90 degree and less than 180 degrees. 90 degrees correspond to the wind power jib 2 perpendicular to the main boom 1, and 180 degrees correspond to the wind power jib 2 overturning in position.

Step S50: the traction means 3 is released, such that the wind power jib 2 overturns automatically under the effect of self gravity and a cushioning member 4 until the wind power jib 2 is overturned in position.

With the support of the cushioning member 4, the wind power jib 2 may slowly move downwards without impacting the main boom 1 after the traction means 3 is released.

The aforementioned technical solution can make full use of the available structure of a complete vehicle. The overturning process is effectuated by drawing of the traction means (including the superlift steel wire rope 33) 3 and thrusting of the cushioning member (including a hydraulic cylinder) 4 without hoisting of auxiliary vehicles, thus reducing the amount of members installed/removed during the transition, and facilitating the assembly and transport. The overturning of the wind power can be effectuated without using auxiliary hoists, thus omitting the expenses of auxiliary hoists. Likewise, the wind power jib is been removed without auxiliary transport vehicles, thus also omitting the time and labor cost of installing/removing the wind power jib 2.

With reference to FIG. 3, the traction means 3 is disposed on a top of the main boom 1, and the traction means 3 pulls the wind power jib 2 upward.

With reference to FIG. 3, the traction means 3 is substantially located at an end of the main boom 1 proximate to the wind power jib 2, and the traction means 3 includes a superlift steel wire rope 33, both ends of which are respectively connected to the main boom 1 and the wind power jib 2. The contraction of the superlift steel wire rope 33 may drive rotation of the wind power jib 2.

Figure 2:
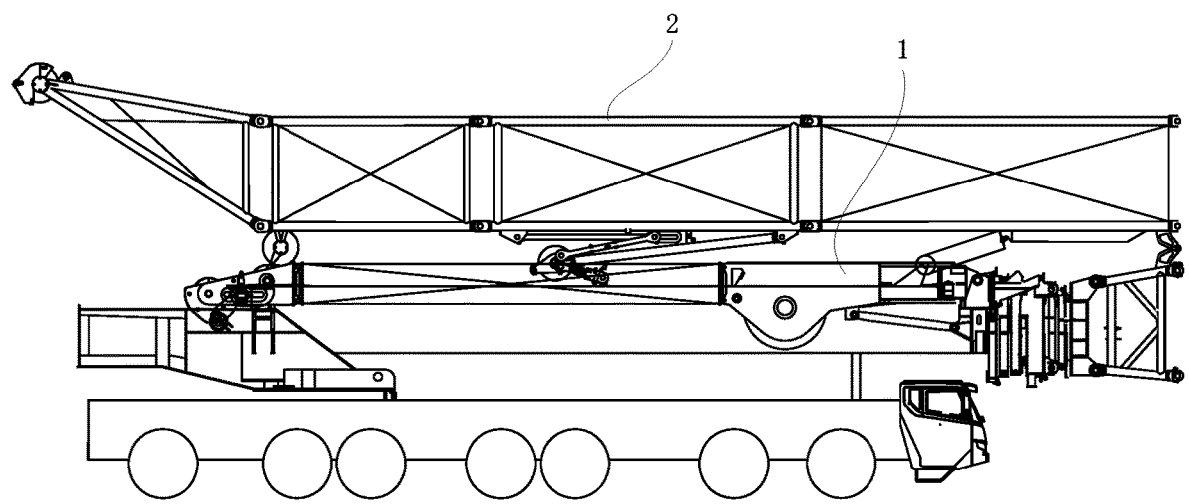
FIG. 2 is a schematic view of the wind power jib of the crane in an overturned state as provided by the embodiments of the present disclosure.

With reference to FIG. 2, the traction means 3 may include a superlift winch 31, a superlift strut 32 and a superlift steel wire rope 33. In the step S20, the method of rotating the wind power jib 2 to a first preset position by using the traction means 3 of the crane includes:

Step I: erecting the superlift strut 32. In this way, the superlift steel wire rope 33 is located in a jacked state, and can subsequently pull the wind power jib 2, as seen in FIG. 3.

Figure 5:
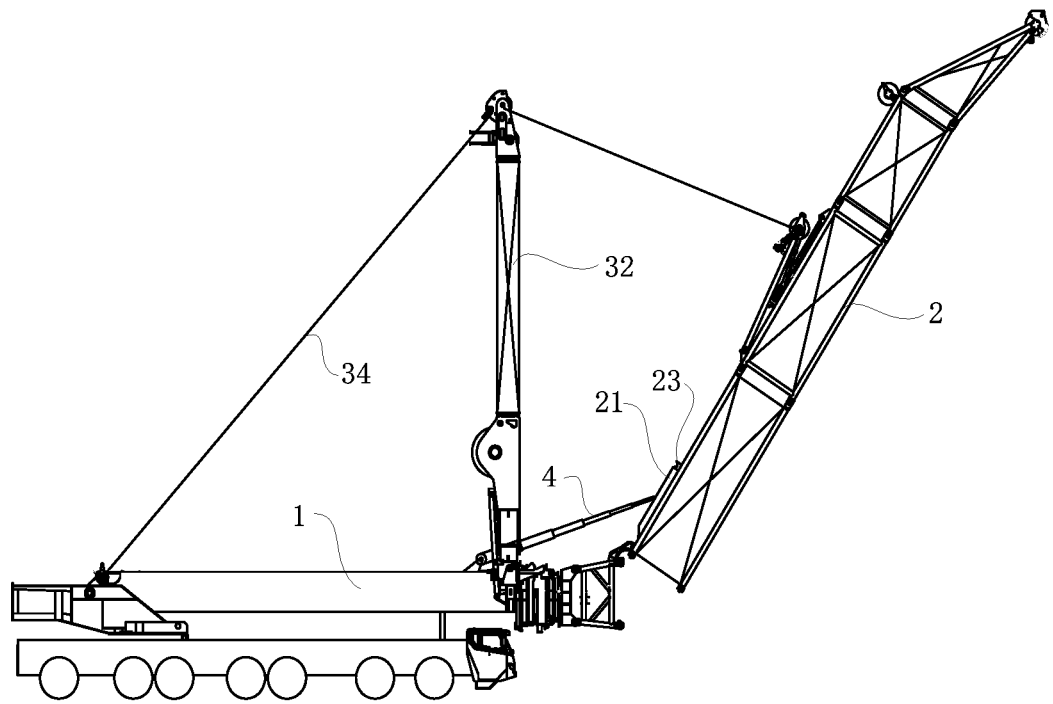
FIG. 5 is a schematic view of the state of the hydraulic cylinder of the crane contacting the wind power jib located at a first preset position as provided by the embodiments of the present disclosure.

Step II: actuating the superlift winch 31, to drive the superlift steel wire rope 30 to be tightened, and the superlift steel wire rope 33 pulls the wind power jib 2 to rotate, until rotating to the first preset position, as seen in FIGS. 4 and 5.

After the step S50, there further include dropping the superlift strut 32.

With reference to FIG. 5, further, in order to ensure the reliability of the cushioning of the cushioning member 4, the cushioning member 4 is always kept in contact with the wind power jib 2 in the rotation process of the wind power jib 2. Alternatively, the wind power jib 2 is provided with a guiding structure 21 capable of accommodating an end of the cushioning member 4. Among them, the end of the overturning hydraulic cylinder is slidable along the guiding structure 21 in the automatic overturning process of the wind power jib 2 under the effect of self gravity and the cushioning member 4.

Next, the shift manners between various sub-steps of the crane from an operational state to a transitional state as provided by the embodiments of the present disclosure will be introduced step by step, so as to accordingly explain in detail the technical solution of the embodiments of the present disclosure.

With reference to FIG. 3, the wind power jib 2 is in a ready state, and the jib lies on its front. By the hydraulic puller, the main pin 5 as shown in FIG. 3 is pulled off, and the rotary pin 6 is retained.

With reference to FIG. 4, the superlift steel wire rope 33 in FIG. 3 is tightened, and the wind power jib 2 is pulled up, so that it rotates counterclockwise.

With reference to FIG. 5, after the wind power jib 2 is pulled up to certain angle, the wind power jib 2 is at the first preset position at this state, and the overturning hydraulic cylinder in the tilting is stretched into a chute of the guiding structure of the wind power jib 2. The overturning hydraulic cylinder may be a multi-stage cylinder.

Figure 6:
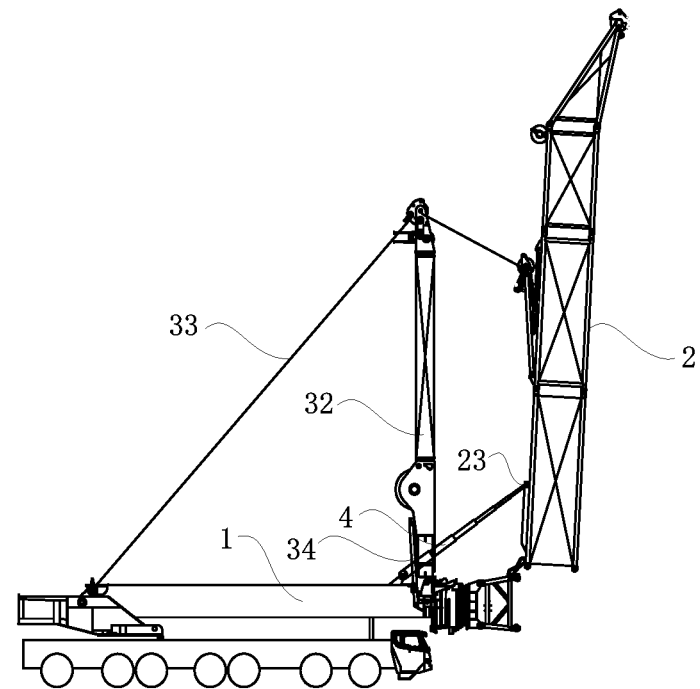
FIG. 6 is a schematic view of the wind power jib of the crane overturning to a vertical position as provided by the embodiments of the present disclosure.

With reference to FIG. 6, the superlift steel wire rope 33 is further tightened, until the overturning hydraulic cylinder as a cushioning member 4 arrives at a cylinder joint 33 on the wind power jib 2, and the overturning hydraulic cylinder will begin to be stressed.

With reference to FIG. 7, the superlift steel wire rope 33 is further tightened, until the wind power jib rotates more than 90°, and the gravity center is shifted to the left side. At this state, the weight of the jib is borne by the overturning hydraulic cylinder, and the superlift steel wire rope 33 no longer provides a pulling force. The superlift cylinder 34 as shown in FIG. 3 is operated to drop the superlift strut 32.

The overturning hydraulic cylinder is manipulated until the wind power jib 2 lies on its front above the main boom 1, in a state as shown in FIG. 2.

With reference to FIGS. 2-7, another embodiment of the present disclosure provides a crane, which may use the crane provided by any technical solution of the embodiments of the present disclosure to implement the aforementioned method for overturning a wind power jib. The crane comprises a main boom 1, a wind power jib 2, a traction means 3 and a cushioning member 4, wherein the wind power jib 2 is rotatable relative to the main boom 1, the traction means 3 is drivingly connected with the wind power jib 2, the cushioning member 4 is disposed at the main boom 1, and the cushioning member 4 is capable of producing a cushioning effect over the wind power jib 2.

The traction means 3 is drivingly connected with the wind power jib 2. When it is d to overturn the wind power jib 2, the traction means 3 drives rotation of the wind power jib 2.

In the operation process of the crane, relative rotation between the wind power jib 1 and the main boom 1 is not allowed; when it is necessary to overturn and fold the wind power jib 2, the connection manner between the wind power jib 2 and the main boom 1 is changed or adjusted, so that the wind power jib 2 is rotatable relative to the main boom 1.

The wind power jib 2 is folded by utilizing the host itself without an auxiliary hoist. The folded wind power jib can be transported with the main boom, and save the cost of the auxiliary hoist and the auxiliary transport vehicle, and also omit such operations as to install/disassemble the wind power jib 2 and thread the steel wire rope, thereby improving the transition efficiency.

The traction means 3 may use a superlift means or other means capable of pulling the wind power jib 2. The cushioning member 4 enables the wind power jib 2 to be cushioned in the overturning process by utilizing the gravity, which ensures the normal overturning of the wind power jib 2.

The aforementioned technical solution can enhance convenient transition, reduce the transition cost, and realize the overall transport of the crane.

In some embodiments, the main boom 1 and the wind power jib 2 therebetween are connected by removable pins, and the pins are distributed at different height positions. In this embodiment, with reference to FIG. 3, the two main pins 5 are located at different heights, and the rotary pin 6 is located at the uppermost. When overturning the wind power jib 2, it is necessary to remove the two main pins 5, and retain the rotary pin 6.

With reference to FIG. 5, In some embodiments, the cushioning member 4 includes a overturning hydraulic cylinder, one end of which is rotatably fixed to the main boom 1, and the other end of which can be stretched to contact the wind power jib 2 located at the first preset position.

With reference to FIG. 5, In some embodiments, the guiding structure 21 is provided with a chute, for allowing the other end of the overturning hydraulic cylinder to enter inside.

With reference to FIG. 5, In some embodiments, the guiding structure 21 is provided with a chute (not shown in the drawing), into which the other end of the overturning hydraulic cylinder can be stretched.

With reference to FIG. 5, In some embodiments, a cylinder joint 23 is slidably provided in the chute and connectable to the other end of the overturning hydraulic cylinder.

Next, the specific structural form of the traction means 3 is introduced. With reference to FIG. 3, In some embodiments, the traction means 3 includes a superlift winch 31, a superlift strut 32 and a superlift steel wire rope 33. The superlift winch 31 is drivingly connected with the superlift steel wire rope 33. The superlift steel wire rope 33 has one end provided at the main boom 1, and the other end provided at the wind power jib 2, a middle part of the superlift wire rope 32 passing through the superlift strut 32 away from the main boom 1. Wherein, the superlift winch 31 is capable of pulling up the wind power jib 2 by means of the superlift steel wire rope 33.

With reference to FIG. 3, In some embodiments, the traction means 3 further includes a superlift cylinder 34 which is drivingly connected with the superlift strut 32, so as to drop or erect the superlift strut 32.

In the description of the present disclosure, it is necessary to understand that, the azimuth or positional relations indicated by the terms "center", "longitudinal", "transverse", "front", "rear", "left", "right", "vertical", "horizontal", "top", "bottom", "within", "outside", which are based on the azimuth or positional relations illustrated by the drawings, are only for facilitating description of the present disclosure and simplifying the description, rather than indicating or implying that the device or element referred to has to present a particular azimuth, and be constructed and operated in a particular azimuth, so that it cannot be understood as limiting the protected content of the present disclosure.

Finally, it should be explained that: the aforementioned embodiments are only used to explain the technical solution of the present disclosure rather than limiting the same; although detailed explanations are made to the present disclosure by referring to preferred embodiments, a common technical person in the art should understand that: he or she may still make modifications to the technical solutions recited in the aforementioned various embodiments, or equivalent replacements to partial technical features therein. However, such modifications or replacements do not make the essence of the corresponding technical solutions depart from the spirit and scope of the technical solutions in the various embodiments of the present disclosure.

That which is claimed is:

1. An operating method of a wind power jib of a crane, comprising following steps:
    rotatably connecting a main boom and the wind power jib of a crane;
    overturning the wind power jib to a first preset position by a traction means of the crane, wherein the first preset position refers to a position at which a gravity center of the wind power jib is located on an outer side area of the main boom;
    contacting a cushioning member with the wind power jib provided at the first preset position;
    drawing the wind power jib to overturn to a second preset position, wherein the second preset position refers to a position at which a gravity center of the wind power jib is located on an inner side area of the main boom; and
    releasing the traction means, such that the wind power jib overturns under the effect of self gravity and the cushioning member until the wind power jib is overturned in position;
    wherein the wind power jib is provided with a guiding structure for accommodating an end of an overturning hydraulic cylinder of the cushioning member; the end of the overturning hydraulic cylinder is slidable along the guiding structure in the overturning process of the wind power jib under the effect of self gravity and the cushioning member.

2. The operating method of a wind power jib of the crane according to claim 1, wherein the step of rotatably connecting the main boom and the wind power jib of the crane comprises:
    pulling off some pins between the main boom and the wind power jib, such that the wind power jib is rotatably connected to the main boom.

3. The operating method of a wind power jib of the crane according to claim 2, wherein the traction means is disposed on a top of the main boom, pulling the wind power jib upward.

4. The operating method of a wind power jib of the crane according to claim 2, wherein pulling off some pins between the main boom and the wind power jib by a hydraulic puller.

5. The operating method of a wind power jib of the crane according to claim 1, wherein the first preset position is a position at which an included angle between the wind power jib and the main boom is α, wherein α is greater than 0 degree and less than or equal to 90 degrees, 0 degree indicating that the wind power jib is horizontal, 90 degrees indicating that the wind power jib is perpendicular to the main boom.

6. The operating method of a wind power jib of a crane according to claim 1, wherein the second preset position is a position at which an included angle between the wind power jib and the main boom is α, wherein α is greater than 90 degree and less than 180 degrees, 90 degree indicating that the wind power jib is perpendicular to the main boom, 180 degrees indicating that the wind power jib is overturned in position.

7. The operating method of a wind power jib of a crane according to claim 1, wherein the traction means comprises a superlift winch, a superlift strut and a superlift steel wire rope;
    the step of overturning the wind power jib to a first preset position by the traction means of the crane comprises:
    erecting the superlift strut; and
    actuating the superlift winch to drive the superlift steel wire rope to be tightened, such that the superlift steel wire rope pulls the wind power jib to rotate.

8. The operating method of a wind power jib of a crane according to claim 7, wherein after the step of releasing the traction means, dropping the superlift strut.

* * * * *